US010896610B2

(12) United States Patent
Amano et al.

(10) Patent No.: US 10,896,610 B2
(45) Date of Patent: Jan. 19, 2021

(54) POSITION-FINDING ASSIST SYSTEM

(71) Applicant: Toyota Jidosha Kabushiki Kaisha, Toyota (JP)

(72) Inventors: Mikihiro Amano, Toyota (JP); Yusuke Takeuchi, Miyoshi (JP); Akinori Shin, Toyota (JP); Tomomi Ogawa, Toyota (JP); Tsutomu Onagi, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/252,038

(22) Filed: Jan. 18, 2019

(65) Prior Publication Data

US 2019/0228660 A1    Jul. 25, 2019

(30) Foreign Application Priority Data

Jan. 22, 2018  (JP) .................... 2018-008064

(51) Int. Cl.
  *G08G 1/14* (2006.01)
  *G02B 27/01* (2006.01)
  *G06F 3/01* (2006.01)
  *H04W 4/02* (2018.01)
  *G08G 1/005* (2006.01)
(52) U.S. Cl.
  CPC .......... *G08G 1/144* (2013.01); *G02B 27/017* (2013.01); *G02B 27/0179* (2013.01); *G06F 3/013* (2013.01); *G08G 1/005* (2013.01); *H04W 4/026* (2013.01); *G02B 2027/0187* (2013.01)

(58) Field of Classification Search
  CPC .................... G01B 1/00; G01C 1/00
  See application file for complete search history.

(56) References Cited

U.S. PATENT DOCUMENTS

2012/0221290 A1* 8/2012 Oka ............... G06F 15/00
                                              702/141
2014/0085109 A1* 3/2014 Stefik ............. G06Q 10/02
                                              340/932.2
(Continued)

FOREIGN PATENT DOCUMENTS

CN    106056973 A    10/2016
JP    2005-326956 A  11/2005
(Continued)

*Primary Examiner* — Shirley Lu
(74) *Attorney, Agent, or Firm* — Dinsmore & Shohl LLP

(57) ABSTRACT

A position-finding assist system includes a glasses-type wearable terminal worn by a user; a terminal position information acquisition unit that acquires position information relating to the wearable terminal; a terminal orientation information acquisition unit that acquires orientation information relating to the wearable terminal; a gaze information acquisition unit that acquires gaze information relating to the user; a target parking position information acquisition unit that acquires target parking position information relating to an occupant-carrier vehicle; and a control unit that displays the target parking position information on a lens section of the wearable terminal so as to be overlaid on an actual scene viewed by the user through the lens section, to assist the user in finding a target parking position, based on the position information, the orientation information, the gaze information, and the target parking position information.

7 Claims, 8 Drawing Sheets

(56) References Cited

U.S. PATENT DOCUMENTS

| | | | | |
|---|---|---|---|---|
| 2014/0176348 A1* | 6/2014 | Acker, Jr. | ............... | G08G 1/146 |
| | | | | 340/932.2 |
| 2016/0169687 A1* | 6/2016 | Yu | ...................... | G01C 21/3688 |
| | | | | 701/468 |
| 2018/0130351 A1* | 5/2018 | Ha | ............................ | B60R 1/00 |
| 2018/0373398 A1* | 12/2018 | Seixeiro | .................. | H04M 1/00 |

FOREIGN PATENT DOCUMENTS

| | | |
|---|---|---|
| JP | 2010-256974 A | 11/2010 |
| JP | 2014-228950 A | 12/2014 |
| KR | 2013-0055180 A | 5/2013 |
| WO | 2015143097 A1 | 9/2015 |

\* cited by examiner

POSITION-FINDING ASSIST SYSTEM

CROSS-REFERENCE TO RELATED APPLICATION

This application is based on and claims priority under 35 USC 119 from Japanese Patent Application No. 2018-008064 filed on Jan. 22, 2018, the disclosure of which is incorporated by reference herein.

BACKGROUND

Technical Field

Japanese Patent Application Laid-Open (JP-A) No. 2005-326956 discloses a parking lot vacant space guidance method in which information such as surrounding images, positions, and so on acquired by other vehicles parked in a parking lot is acquired via inter-vehicle communication, and a virtual overhead image is generated based on this information. This method is capable of assisting a driver in searching for an available parking location by displaying the virtual overhead image on a display section.

Related Art

In the parking lot vacant space guidance method described in JP-A No. 2005-326956, the virtual overhead image displayed on the display section and the real-life scene viewed by the driver from the driving seat of the vehicle are viewed from different directions, leading to issues such as the driver being unable to ascertain the target location in an intuitive manner.

SUMMARY

In consideration of the above circumstances, an object of the present disclosure is to obtain a position-finding assist system enabling a desired parking space or the like to be found in an intuitive manner.

A position-finding assist system of a first aspect of the present disclosure includes a glasses-type wearable terminal worn by a user, a terminal position information acquisition unit that acquires position information relating to the wearable terminal, a terminal orientation information acquisition unit that acquires orientation information relating to the wearable terminal, a gaze information acquisition unit that acquires gaze information relating to the user, and a target parking position information acquisition unit that acquires target parking position information relating to an occupant-carrier vehicle. The position-finding assist system of the first aspect further includes a control unit that displays the target parking position information on a lens section of the wearable terminal so as to be overlaid on an actual scene viewed by the user through the lens section to assist the user in finding a target parking position, based on the position information, the orientation information, the gaze information, and the target parking position information.

In the position-finding assist system of the first aspect of the present disclosure, the control unit derives the direction and position of the target parking position from the perspective of the user based on the acquired terminal position information, target parking position information, gaze information relating to the user (referred to hereafter as "gaze information" as appropriate), and terminal orientation information (referred to hereafter as "orientation information" as appropriate). The target parking position is displayed on the lens section so as to be overlaid on the scene viewed by the user. This thereby enables the user to view position information relating to a destination overlaid on a real-life scene. This thereby enables the user to intuitively obtain the target parking position information via an actual scene. The "actual scene" referred to here is a scene viewed by the user through the lens section of the glasses-type wearable terminal (referred to hereafter as "terminal" as appropriate) excluding information displayed on the wearable terminal itself (or a scene that is visible when the wearable terminal has been removed).

Note that "target parking position information" refers to information relating to a position in which the vehicle is parked, or information relating to a position where the vehicle is attempting to park. The "gaze information" refers to information relating to the gaze of the user (the direction in which their eyes are looking). The "orientation information" refers to information relating to the direction and the like of the wearable terminal.

A position-finding assist system of a second aspect of the present disclosure is the position-finding assist system of the first aspect, wherein the occupant-carrier vehicle is a vehicle carrying the user, and the target parking position information is information relating to an available parking position for the occupant-carrier vehicle.

The position-finding assist system of the second aspect enables the user on board the vehicle to obtain information relating to an available parking position for the vehicle they are on board. In such cases, despite being in the process of driving, the user is capable of intuitively obtaining the information relating to the available parking position within their field of view while driving. Namely, there is no need for the user to divert their gaze away from the field of view required for driving in order to obtain the information relating to the available parking position. This enables the occurrence of a situation in which the user is late to see an obstacle when driving to be suppressed. In other words, the user is able to acquire the target parking position information in a safe manner.

Note that "available parking position" refers to a space in a parking lot in which no other vehicle is parked, often referred to as an "empty space".

A position-finding assist system of a third aspect of the present disclosure is the position-finding assist system of the second aspect, further including a size information acquisition unit that acquires size information of the target parking position information. In cases in which the control unit has acquired plural items of target parking position information, the control unit prioritizes display on the lens section of the wearable terminal of the target parking position information relating to a larger size target parking position so as to be overlaid on the actual scene viewed by the user through the lens section.

Note that "prioritizes display" refers to, for example, displaying information relating to a larger sized target parking position instead of displaying information relating to a smaller sized target parking position, or displaying information relating to a larger sized target parking position initially, after which information relating to a smaller sized target parking position is displayed. Alternatively, such display may employ colors, shapes, sizes, or techniques such as flashing that are more noticeable to the user than those employed in non-prioritized display, or the target of the "prioritized display" may be prioritized so as to be displayed instead of other information that is not displayed.

In the position-finding assist system of the third aspect, in cases in which plural items of target parking position information are acquired, information relating to a larger sized target parking position is prioritized for display. Namely, making the user aware of the larger sized available parking position is prioritized. This thereby enables the user to prioritize finding an available parking position that is larger in size and thus easier to park in.

A position-finding assist system of a fourth aspect of the present disclosure is the position-finding assist system of the second aspect or the third aspect, wherein, in cases in which information relating to plural adjacent target parking positions has been acquired, the control unit prioritizes display on the lens section of the wearable terminal of the adjacent target parking position information so as to be overlaid on the actual scene viewed by the user through the lens section.

The position-finding assist system of the fourth aspect of the present disclosure is the position-finding assist system of the second aspect or the third aspect, wherein in cases in which information relating to plural adjacent available parking positions has been acquired, the control unit prioritizes display of these available parking positions over that of other available parking positions. This thereby enables the user to prioritize finding adjacent empty spaces that are comparatively easy to park in.

A position-finding assist system of a fifth aspect of the present disclosure is the position-finding assist system of any one of the second aspect to the fourth aspect, further including a departure prediction unit that predicts a departure of another vehicle. The control unit further displays a position of the other vehicle predicted to depart by the departure prediction unit on the lens section of the wearable terminal so as to be overlaid on the actual scene viewed by the user through the lens section.

In the position-finding assist system of the fifth aspect of the present disclosure, departure of another vehicle is predicted, and the position of this vehicle is displayed. Namely, even in a situation in which there is no available parking position, parking position information relating to a vehicle that is expected to leave in the near future is displayed. This thereby enables the user to search for position information relating to a vehicle with a high likelihood of departing.

A position-finding assist system of a sixth aspect of the present disclosure is the position-finding assist system of any one of the second aspect to the fifth aspect, further including a destination information acquisition unit that acquires information relating to a destination that the user will travel to after parking the occupant-carrier vehicle. The control unit prioritizes display, on the lens section of the wearable terminal, of target parking position information close to the destination so as to be overlaid on the actual scene viewed by the user through the lens section.

In the position-finding assist system of the sixth aspect of the present disclosure, information relating to the destination that the user will travel to after parking the occupant-carrier vehicle is acquired, and display on the lens section prioritizes parking spaces close to the destination. This thereby enables the user to prioritize finding a parking space close to the destination. This thereby enables the distance traveled on foot by the user to the destination after parking to be reduced.

Note that the "destination" may, for example, be the location of an exit from the parking lot, the location of a staircase, or the location of an elevator.

A position-finding assist system according to a seventh aspect of the present disclosure is the position-finding assist system of the first aspect, wherein the occupant-carrier vehicle is a vehicle that the user intends to board, and the target parking position information is position information relating to a location where the occupant-carrier vehicle is parked.

In the position-finding assist system according to the seventh aspect of the present disclosure, the position of the vehicle that the user intends to board is displayed. This thereby enables the user to search for the position of the vehicle they intend to board in an intuitive manner.

As described above, the position-finding assist system of the first aspect of the present disclosure exhibits the effect of enabling the user to acquire target parking position information in an intuitive manner.

The position-finding assist system of the second aspect of the present disclosure exhibits the effect of enabling the user to acquire information relating to an available parking position.

The position-finding assist system of the third aspect of the present disclosure exhibits the effect of enabling user acquisition of information relating to a position that is easier to park in to be prioritized.

The position-finding assist system of the fourth aspect of the present disclosure exhibits the effect of enabling user acquisition of information relating to a position that is even easier to park in to be prioritized.

The position-finding assist system of the fifth aspect of the present disclosure exhibits the effect of enabling the user to acquire information relating to a position that is predicted to become available for parking.

The position-finding assist system of the sixth aspect of the present disclosure exhibits the effect of enabling user acquisition of information relating to an available parking position that is close to a location to which the user will travel after parking to be prioritized.

The position-finding assist system of the seventh aspect of the present disclosure exhibits the effect of enabling the user to acquire information relating to the position of the vehicle they intend to board.

BRIEF DESCRIPTION OF THE DRAWINGS

Example embodiments of the present disclosure will be described in detail based on the following figures, wherein.

DETAILED DESCRIPTION

Explanation follows regarding example embodiments of a position-finding assist system according to the present disclosure, with reference to the drawings. Note that in the respective drawings, the arrow FR indicates toward a vehicle front, the arrow UP indicates toward a vehicle upper side, and the arrow RH indicates toward a vehicle right, as appropriate. Unless specifically stated otherwise, in the following explanation reference to the front-rear, up-down, and left-right directions refers to front-rear in the vehicle front-rear direction, up-down in the vehicle vertical direction, and left and right when facing in a direction of travel.

First Example Embodiment

System Configuration

Figure 1:
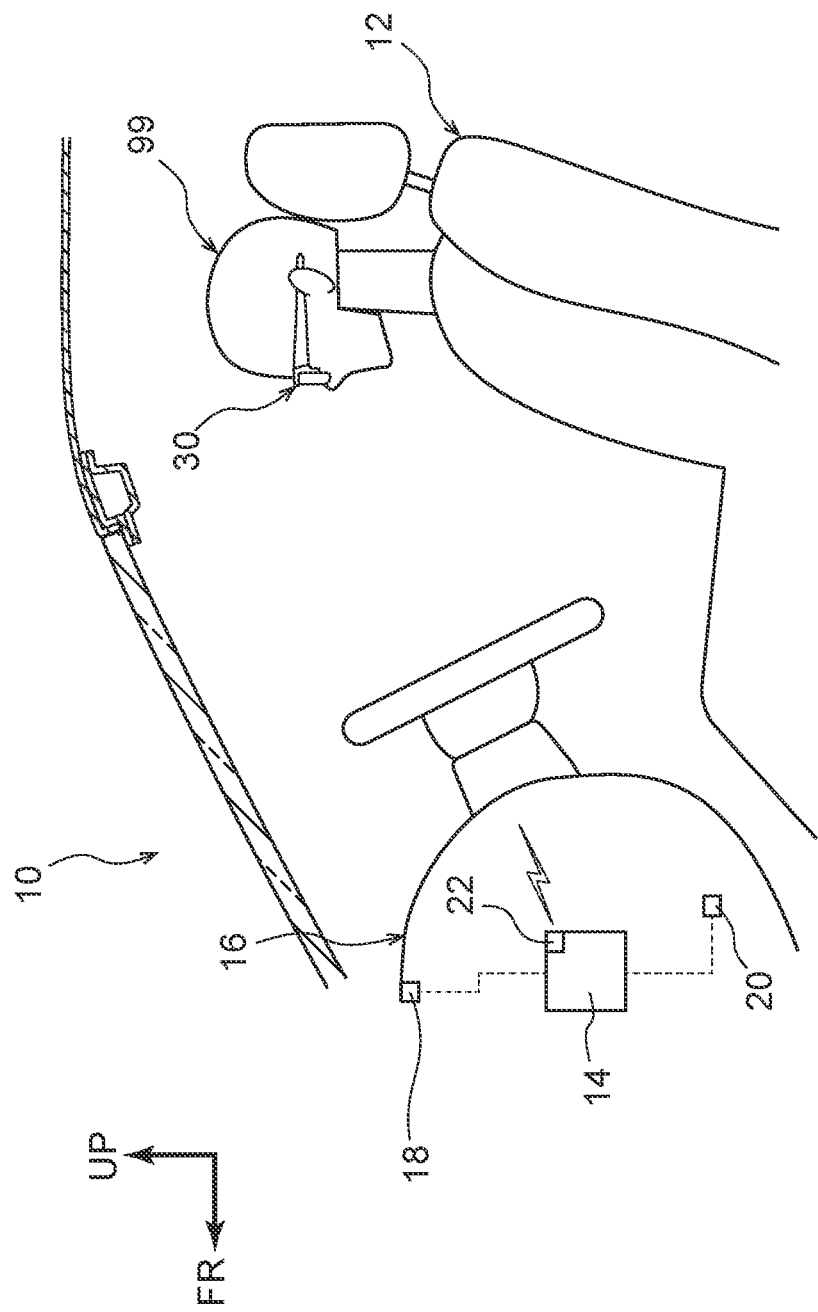
FIG. 1 is a schematic view illustrating part of a position-finding assist system according to a first example embodiment.
Figure 2:
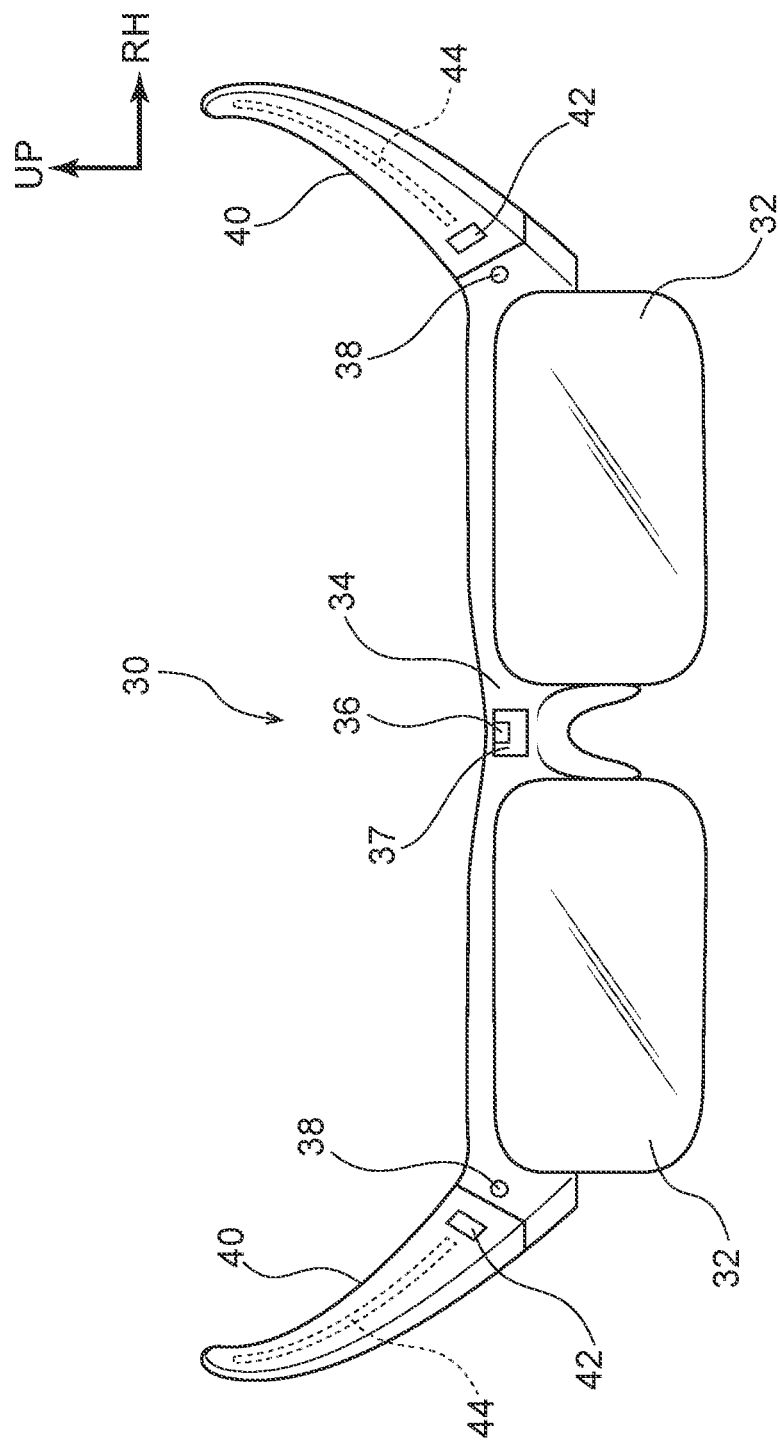
FIG. 2 is a schematic view illustrating an outline of a wearable terminal of a position-finding assist system according to the first example embodiment.

First, explanation follows regarding an outline of configuration elements of a position-finding assist system according to a first example embodiment, with reference to FIG. 1 and FIG. 2.

FIG. 1 is a schematic diagram illustrating part of the configuration of the position-finding assist system according to the first example embodiment. As illustrated in FIG. 1, a user 99 is seated on a seat 12 configuring a driving seat of a vehicle 10, this being an occupant-carrier vehicle.

The user 99 wears a glasses-type wearable terminal 30 (hereafter referred to as "wearable terminal 30" as appropriate) on their head. A data processor 14 configuring a controller is installed inside an ECU console box (not illustrated in the drawings) provided inside an instrument panel 16. A vehicle position information acquisition section 18 provided to the instrument panel 16 of the vehicle 10, and a vehicle information storage section 20, are both electrically connected to the data processor 14. Note that the data processor 14 is configured including a vehicle-side communication section 22 that is capable of exchanging data with the wearable terminal 30 and so on by wireless communication.

FIG. 2 is a schematic diagram outlining the wearable terminal 30 of the position-finding assist system according to the first example embodiment. The glasses-type wearable terminal 30 illustrated in FIG. 2 is illustrated schematically in order to describe details of the wearable terminal 30 worn by the user 99 illustrated in FIG. 1. Note that FIG. 2 is a schematic diagram illustrating the wearable terminal 30 as viewed from the side of the user 99 wearing the wearable terminal 30.

Note that a lens section (lenses 32) of the glasses-type wearable terminal 30 configures a display section (hereafter also referred to as "display section 32" as appropriate) for displaying various information. A terminal-side data processor 37 (control unit), configured including a terminal-side communication section 36 capable of exchanging data, is provided to a centrally positioned bridge 34 between the left and right pair of lenses 32. Cameras 38, serving as a gaze information acquisition unit that acquires information relating to the gaze of the user 99, are provided on either side of the left and right pair of lenses 32. Left and right temples 40 are positioned on either side of the lenses 32, and a gyro sensor 42, serving as an orientation information acquisition unit of the wearable terminal, is provided near to a base portion of each temple 40. A terminal position information acquisition section 44, serving as a terminal position information acquisition unit, is provided running along the length direction of each of the left and right temples 40, extending from near the base toward a leading end side of each of the left and right temples 40.

Connection and Communication

Figure 3:
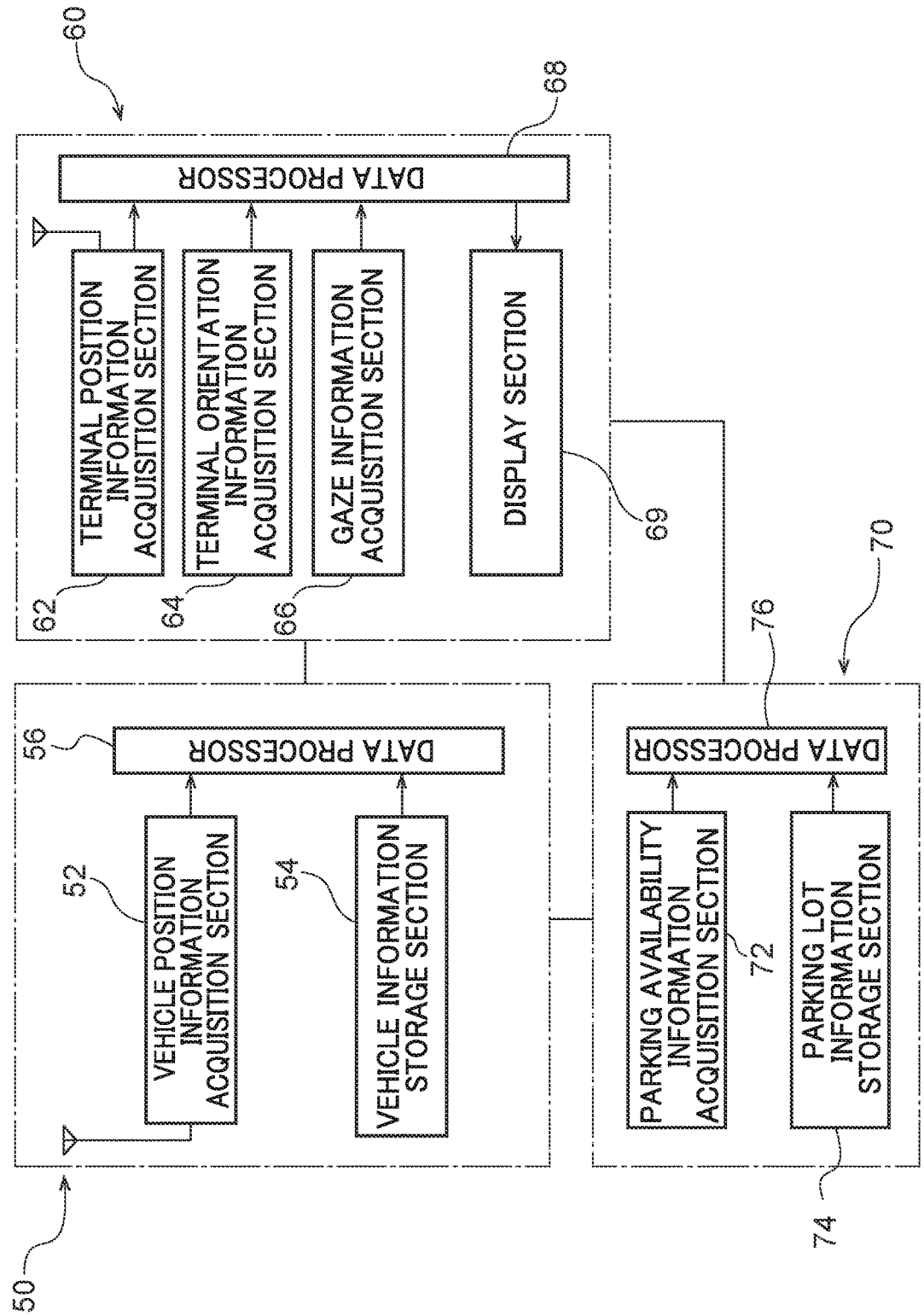
FIG. 3 is a block diagram illustrating configuration elements of a position-finding assist system according to the first example embodiment.

Explanation follows regarding connection and communication between the respective configuration elements of the position-finding assist system according to the first example embodiment, with reference to FIG. 3. Note that configuration elements corresponding to the respective elements in FIG. 1 or FIG. 2 are appended with the same reference numerals, and duplicate explanation thereof is omitted.

FIG. 3 is a block diagram illustrating respective configuration elements of the position-finding assist system according to the first example embodiment. As illustrated in FIG. 3, the system is configured including a vehicle system 50, a wearable terminal system 60, and a parking lot system 70, this being a target parking position information acquisition unit.

The vehicle system 50 is configured including a vehicle position information acquisition section 52, a vehicle information storage section 54, and a data processor 56 configuring a controller. The vehicle system 50 is mounted to the vehicle 10 carrying the user 99 as illustrated in FIG. 1.

The vehicle position information acquisition section 52 in the vehicle acquires vehicle position information using a GPS satellite system (not illustrated in the drawings). The vehicle information storage section 20 stores information such as the size of the vehicle 10. Data acquired by or stored in these configuration sections is received by the data processor 56. The data processor 56 directly or indirectly exchanges data with the respective configuration sections of the wearable terminal system 60 and the parking lot system 70 through the terminal-side communication section 36 included in the data processor 56.

The wearable terminal system 60 is configured including a terminal position information acquisition section 62, a terminal orientation information acquisition section 64, a gaze information acquisition section 66, a data processor 68 configuring a controller, and a display section 69.

The terminal position information acquisition section 62 acquires position information relating to the wearable terminal 30. The terminal orientation information acquisition section 64 acquires, for example, information relating to the orientation and aspect of the wearable terminal. The gaze information acquisition section 66 acquires information relating to the gaze of the user 99 wearing the wearable terminal 30.

The data processor 68 receives data acquired by the respective configuration sections of the terminal position information acquisition section 62, the terminal orientation information acquisition section 64, and the gaze information acquisition section 66. The data processor 68 also acquires information such as position information and the vehicle size of the vehicle 10 from the vehicle system 50. The data processor 68 generates display data to be displayed on the display section 69 from this acquired data.

The parking lot system 70 is configured including a parking availability information acquisition section 72, a parking lot information storage section 74, and a data processor 76 configuring a controller. Note that the parking lot system 70 configures part of a parking lot 400 (illustrated in FIG. 7) in which the user 99 searches for a parking space.

The parking availability information acquisition section 72 acquires information relating to whether or not another vehicle is already parked in each parking space in the parking lot 400. Information relating to the parking lot 400, such as the size of each parking space and the position of an exit from the parking lot 400, is stored in the parking lot information storage section 74. The data processor 76 directly or indirectly exchanges data with the respective configuration sections of the vehicle system 50 and the wearable terminal system 60.

System Flow

Figure 4:
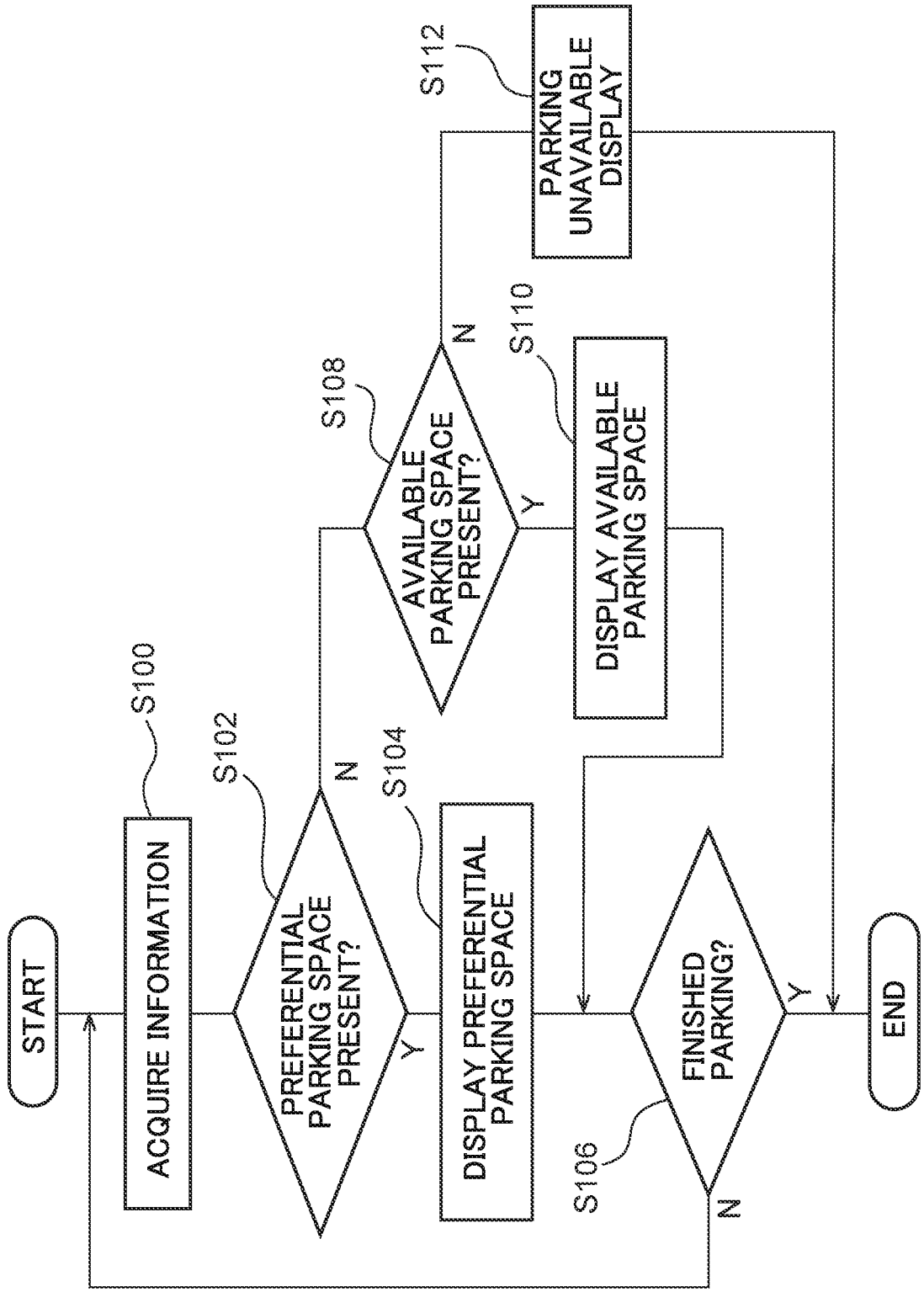
FIG. 4 is a flowchart illustrating operation of a position-finding assist system according to the first example embodiment.

Next, explanation follows regarding a system flow of the position-finding assist system according to the first example embodiment, with reference to FIG. 4.

Note that the position-finding assist system according to the first example embodiment is implemented when the user 99 on board the vehicle 10 searches for an available parking space within the boundaries of a parking lot.

First, at step S100, various information required to make subsequent determinations (at steps S102, S106, and S108) is acquired. Note that the various information refers to position information relating to the vehicle 10, size information relating to the vehicle 10 acquired from the vehicle information storage section 54, terminal position information, terminal orientation information, gaze information relating to the user 99, parking availability information and parking lot information, or a combination of several of these types of information. When this various information has been acquired, processing transitions to step S102.

At step S102, determination is made as to whether or not a preferential parking space is available, based on the various information acquired at step S100. In cases in which affirmative determination is made at step S102, processing transitions to step S104. In cases in which negative determination is made at step S102, processing transitions to step S108.

Note that a preferential parking space refers to an available parking space that satisfies a pre-set condition. Examples of such conditions include being a larger sized parking space, being plural adjacent available parking spaces, or being an available parking space positioned close to an exit from the parking lot (or to a staircase or elevator).

Figure 5:
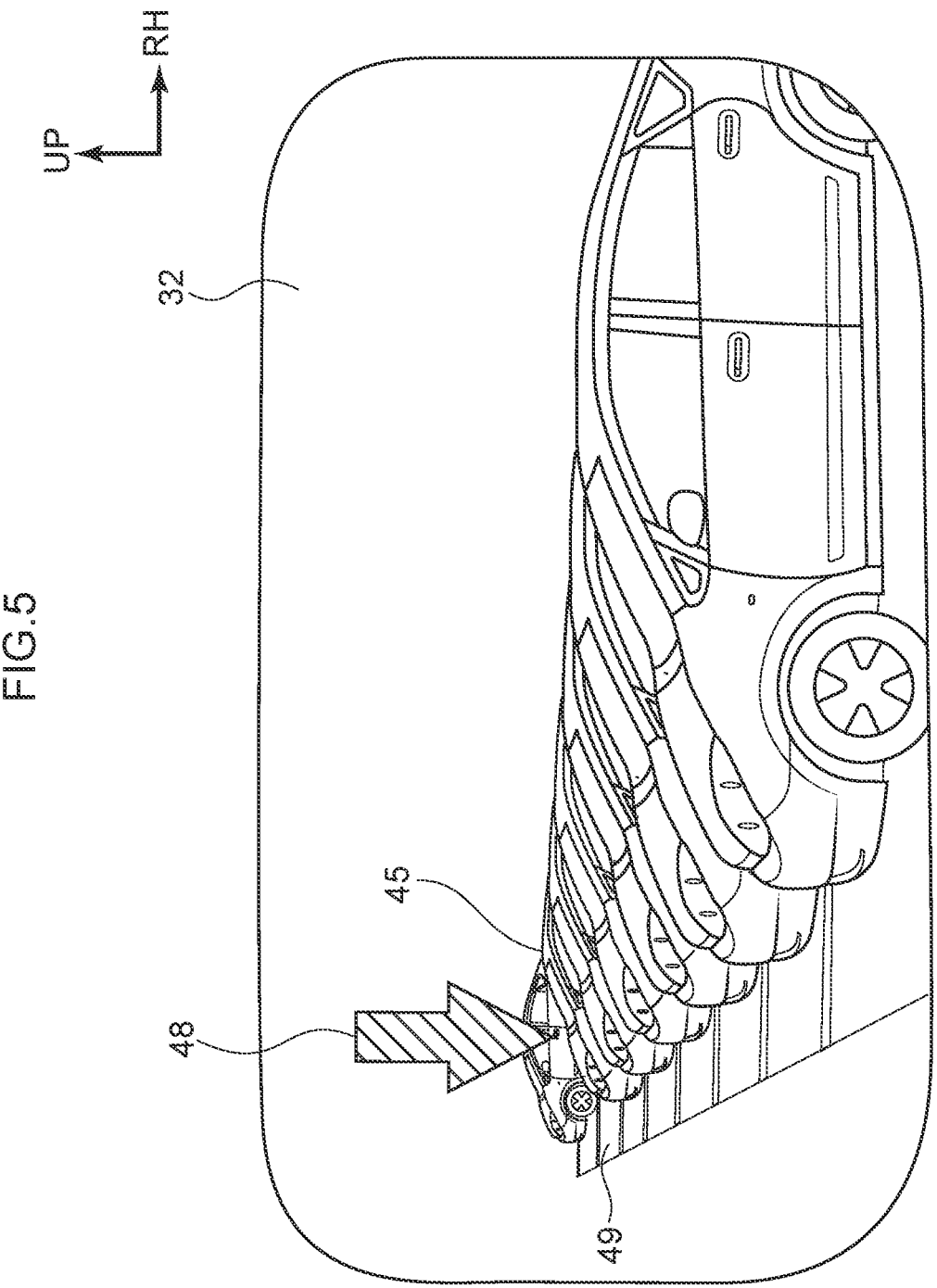
FIG. 5 is a schematic view illustrating a scene viewed by a user through a wearable terminal of a position-finding assist system according to the first example embodiment.

At step S104, the preferential parking space, this being an example of target parking position information, is displayed on the display section 32 of the wearable terminal 30. Note that as illustrated in FIG. 5, this display is displayed so as to be overlaid on the real-life scene viewed by the user 99 through the lens section (display section 32) of the wearable terminal, based on the various information acquired at step S100 (FIG. 5 will be discussed later). When the processing of step S104 has ended, processing transitions to step S106.

At step S106, determination is made as to whether or not the user 99 has finished parking the vehicle 10 in the preferential parking space. In cases in which affirmative determination is made at step S106, the system processing is ended. In cases in which negative determination is made at step S106, processing returns to step S100.

Note that determination as to whether or not parking is complete may be made by, for example, comparing vehicle position information or terminal position information against parking lot information (parking lot position information).

At step S108, determination is made as to whether or not an available parking space is present. An available parking space refers to other available parking spaces that do not correspond to preferential parking spaces as determined at step S102. In cases in which affirmative determination is made at step S108, processing transitions to step S110. In cases in which negative determination is made at step S108, processing transitions to step S112.

At step S110, an available parking space, this being an example of target parking position information, is displayed on the display section 32 of the wearable terminal 30. Note that at step S110, similarly to step S104, this display is displayed so as to be overlaid on the real-life scene viewed by the user 99 through the lens section (display section 32) of the wearable terminal. When the processing of step S110 has ended, processing transitions to step S106.

At step S112, parking unavailable information (information indicating that no available parking spaces are present) is displayed on the display section 32 of the wearable terminal 30. When the processing of step S112 has ended, the system processing is ended.

Operation and Effects

Explanation follows regarding operation and effects of the position-finding assist system according to the first example embodiment.

Figure 6:
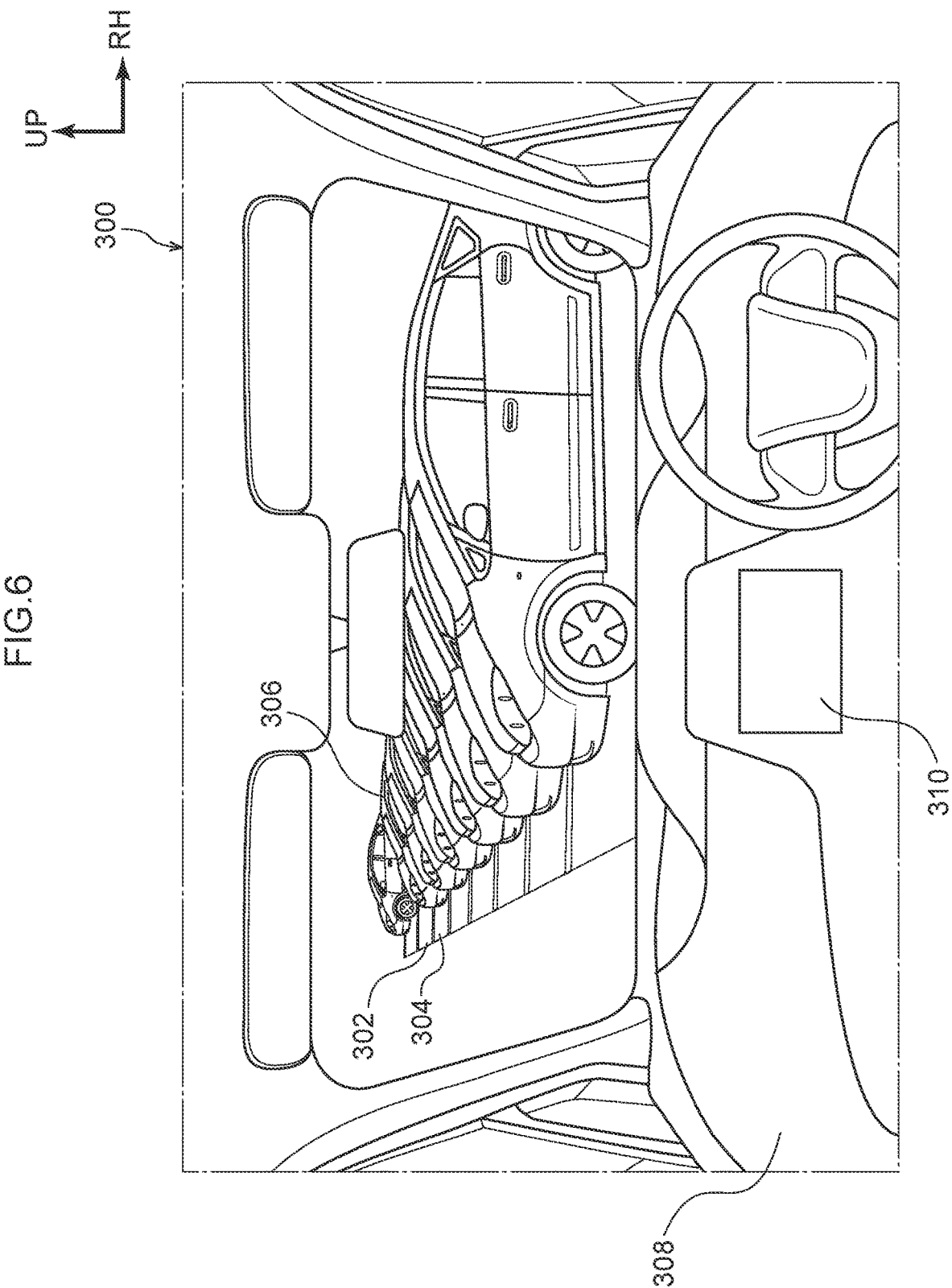
FIG. 6 is a schematic view illustrating a scene viewed from the viewpoint of a driver when searching for a parking space hitherto.

FIG. 6 is a diagram explaining a method of searching for an available parking space hitherto (a case in which the position-finding assist system according to the first example embodiment is not employed), by way of comparison. In the method employed hitherto, a driver driving a vehicle searches for an available parking space 302 in a scene 300 viewed from a driving seat. In this case, as illustrated in FIG. 6, the field of view of the driver is obstructed by a vehicle 306 parked in a parking space 304 adjacent to the available parking space 302, making the available parking space 302 difficult to find. An alternative method would be to display information relating to the available parking space 302 on a monitor 310 separately provided on an instrument panel 308 or the like. However, in this case, the driver would look back and forth between the scene 300 viewed from the driving seat and the monitor 310, such that it would be difficult to intuitively (easily) find the available parking space 302.

In contrast thereto, FIG. 5 is a diagram schematically illustrating a scene viewed by the user 99 through the display section 32 of the wearable terminal 30 of the position-finding assist system according to the first example embodiment. As illustrated in FIG. 5, when the position-finding assist system according to the first example embodiment is in operation, target parking position information 48, this being a search target, is displayed on the display section 32 of the wearable terminal 30 worn by the user 99. Note that in FIG. 5, the downward-pointing arrow (the target parking position information 48) is displayed in order to indicate an available parking space 49.

This enables to user 99 to find the available parking space 49 intuitively (easily) while still viewing the real-life scene (the scene viewed by the user 99 through the display section 32 of the wearable terminal 30). Even in situations in which the available parking space 49 itself is not visible due to being blocked by another vehicle 45, a pillar (a pillar 410 in FIG. 7), a wall (not illustrated in the drawings), or the like, the target parking position information 48 is displayed using an arrow or the like, such the available parking space 49 is easier for the user 99 to find.

The position-finding assist system according to the first example embodiment is capable of prioritizing display of a preferential parking space as the target parking position.

Figure 7:
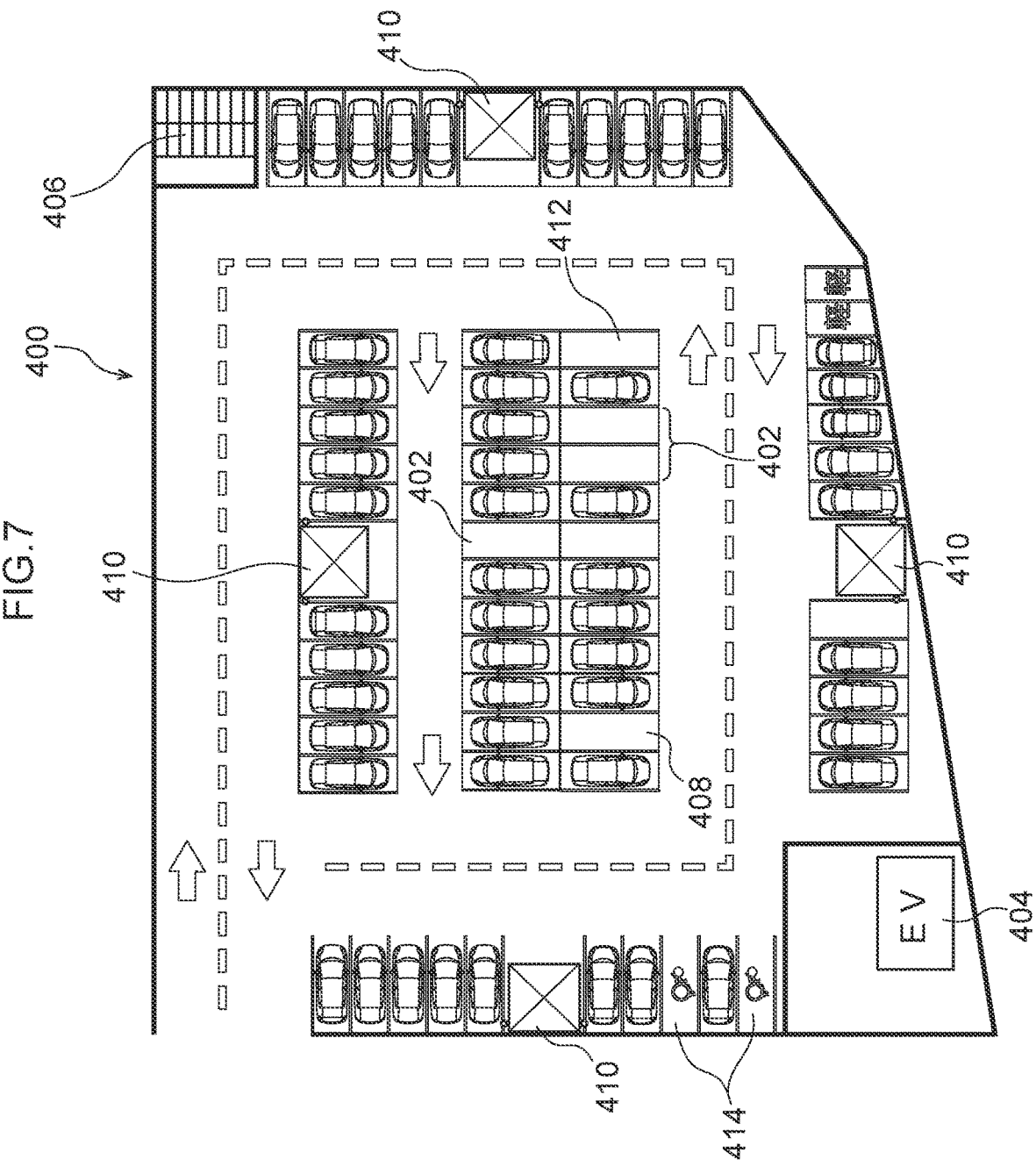
FIG. 7 is a schematic view viewed from above, illustrating an example of a parking lot in which a target parking space is sought by a position-finding assist system according to the first example embodiment.

Explanation follows regarding target parking positions and preferential parking spaces in the position-finding assist system according to the first example embodiment, with reference to FIG. 7. Note that FIG. 7 is a schematic diagram viewed from above, illustrating an example of the parking lot 400 in which a target parking space is sought in the position-finding assist system according to the first example embodiment.

In FIG. 7, preferential parking spaces include, for example, a larger sized parking space, plural adjacent available parking spaces (such as 402 in FIG. 7), and an available parking space positioned close to an exit from the parking lot (or to a staircase 406 or an elevator 404) (such as 408 in FIG. 7).

For example, a larger sized parking space is a parking space that is large relative to the vehicle 10 carrying the user 99, such that it is relatively easy for the user 99 to maneuver the vehicle 10 when parking. Plural adjacent available parking spaces enable the user 99 to enter an adjacent parking space while parking, such that it is relatively easy for the user 99 to maneuver the vehicle 10 when parking. An available parking space positioned close to an exit from the parking lot is close to an exit to which the user 99 is expected to travel after having parked, thereby enabling the travel distance of the user 99 after parking to be reduced, enabling greater convenience. For these reasons, such parking spaces are defined as preferential parking spaces.

As described above, the position-finding assist system according to the first example embodiment enables the user 99 to intuitively obtain position information relating to a preferential parking space (a space in which it is easy to park, or a convenient parking space).

Furthermore, in cases in which there is no information relating to a target parking position corresponding to a preferential parking space, the position-finding assist system according to the first example embodiment is capable of displaying target parking position information relating to an available parking space on the display section 32 of the wearable terminal 30. This enables the user 99 to intuitively obtain position information relating to an available parking space.

In cases in which there is no target parking position information relating to either a preferential parking space or an available parking space, a parking unavailable display (a display indicating that there is no available target parking position information) is displayed on the display section 32 of the wearable terminal 30. This enables the user 99 to intuitively ascertain that there are currently no available parking spaces present.

Note that in cases in which there is no target parking position information relating to either a preferential parking space or an available parking space, position information relating to other vehicles that are predicted to leave the parking lot (as well as information relating to expected departure times and so on) may be displayed on the display section 32 of the wearable terminal 30 in addition to (or instead of) displaying the parking unavailable display.

Displaying position information relating to other vehicles that are predicted to leave the parking lot on the display section 32 of the wearable terminal 30 in this manner enables the user 99 to ascertain information relating to the other vehicles that are expected to leave, enabling stress felt while waiting for other vehicles to leave to be reduced. This also enables the user 99 to move the vehicle 10 near to a parking space that is expected to be vacated soonest, thereby enabling the time spent parking in a parking space to be reduced.

Note that prediction of departures may be performed by the data processor (14, 56, or 76) provided included in the vehicle 10 or the parking lot system 70, or by a departure prediction unit provided separately to the vehicle 10 and the parking lot system 70. Examples of vehicles that are predicted to leave include vehicles for which a parking fee has been paid at a machine provided in the parking lot, vehicles that have been continually parked for a fixed duration, and vehicles with a power unit that has been switched ON after having been parked for a fixed duration. An example of a departure prediction unit to predict such departures is a combination of sensors provided in the parking lot 400 that distinguish whether or not a parked vehicle is present, whether a power unit is ON or OFF, whether or not an occupant is on board, or the like, and a controller that makes a departure prediction based on this information.

The glasses-type wearable terminal 30 may include a CPU (the data processor 68), ROM, RAM, storage, and a communication interface. These configurations are connected together so as to be capable of communicating through a bus.

The CPU is a central computation processing unit that executes various programs and controls various sections. Namely, the CPU reads programs from the ROM or the storage, and executes the programs using the RAM as a workspace. The CPU controls the various configurations and performs various computations processing according to the programs recorded in the ROM or the storage.

The ROM stores various programs and various data. The RAM serves as a workspace that temporarily retains programs and data. The storage is configured by a Hard Disk Drive (HDD) or a Solid State Drive (SSD), and stores various programs including an operating system, and various data. The communication interface is an interface for communication, and, for example, employs an Ethernet (registered trademark), FDDI, Wi-Fi (registered trademark), or other standard.

Second Example Embodiment

Explanation follows regarding a position-finding assist system according to a second example embodiment.

The position-finding assist system according to the second example embodiment is a modified example of the position-finding assist system according to the first example embodiment. Accordingly, details that overlap with the explanation of the position-finding assist system according to the first example embodiment are appended with the same reference numerals, and explanation thereof is omitted as appropriate.

Since the system configuration of the position-finding assist system according to the second example embodiment is the same as the system configuration of the position-finding assist system according to the first example embodiment, explanation thereof is omitted.

Figure 8:
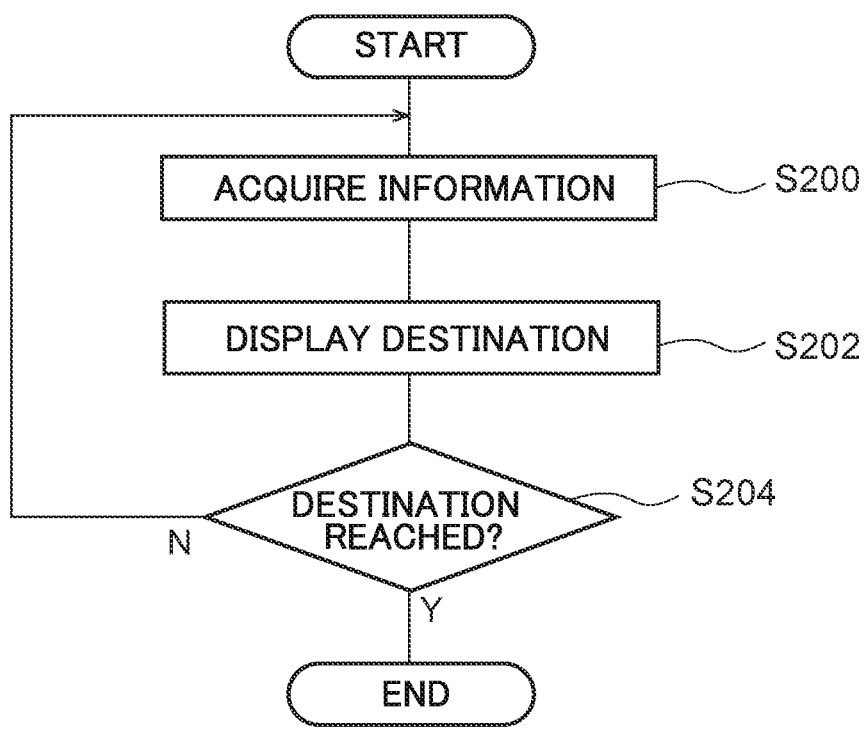
FIG. 8 is a flowchart illustrating operation of position-finding assist systems according to a second example embodiment and a third example embodiment.

Next, explanation follows regarding a system flow of the position-finding assist system according to the second example embodiment, with reference to FIG. 8.

Note that the position-finding assist system according to the second example embodiment is implemented after the user 99 on board the vehicle 10 has finished parking in a parking space within the boundaries of the parking lot.

First, at step S200, various information required to make a subsequent determination (at step S204) is acquired. Note that the various information refers to position information relating to the vehicle 10, terminal position information, terminal orientation information, gaze information relating to the user 99, parking availability information and parking lot information, or a combination of several of these types of information. Note that parking lot information includes, for example, information relating to an exit from the parking lot (including the position of an elevator or staircase). When this various information has been acquired, processing transitions to step S202.

At step S202, parking lot information (such as position information relating to an exit from the parking lot), this being destination information, is displayed on the display section 32 of the wearable terminal 30. Note that this display, based on the various information acquired at step S200, is displayed so as to be overlaid on the real-life scene viewed by the user 99 through the lens section (display section 32) of the wearable terminal. When the processing of step S202 has ended, processing transitions to step S204.

At step S204, determination is made as to whether or not the user 99 has reached the destination displayed at step S202. In cases in which affirmative determination is made at step S202, the system processing is ended. In cases in which negative determination is made at step S202, processing returns to step S200.

Operation and Effects

Explanation follows regarding operation and effects of the position-finding assist system according to the second example embodiment.

In the position-finding assist system according to the second example embodiment, parking lot information (such as position information relating to an exit from the parking lot), this being destination information, is displayed on the display section 32 of the wearable terminal 30 worn by the user 99 who has finished parking. This enables the user 99 to intuitively ascertain which direction to head in after having exited the vehicle 10. This enables the user 99 to easily reach their destination.

Third Example Embodiment

Explanation follows regarding a position-finding assist system according to a third example embodiment.

The position-finding assist system according to the third example embodiment is a modified example of the position-finding assist systems according to the first example embodiment and the second example embodiment. Accordingly, details that overlap with the explanation of the position-finding assist systems according to the first example embodiment and the second example embodiment are appended with the same reference numerals, and explanation thereof is omitted as appropriate.

Since the system configuration of the position-finding assist system according to the third example embodiment is the same as the system configuration of the position-finding assist systems according to the first example embodiment and the second example embodiment, explanation thereof is omitted.

Next, explanation follows regarding a system flow of the position-finding assist system according to the third example embodiment, with reference to FIG. 8.

Note that the position-finding assist system according to the third example embodiment is implemented when a user 99 searching for a vehicle configuring a search target searches for the parking space where the search target vehicle has been parked within the boundaries of the parking lot.

First, at step S200, various information required to make a subsequent determination (at step S204) is acquired. Note that the various information in the third example embodiment refers to position information relating to the search target vehicle, terminal position information, terminal orientation information, gaze information relating to the user 99, parking lot information, or a combination of several of these types of information. When this various information has been acquired, processing transitions to step S202.

At step S202, position information relating to the target vehicle configuring the search target (or position information relating to the target parking space where the target vehicle configuring the search target is parked) is displayed on the display section 32 of the wearable terminal 30. Note that this display, based on the various information acquired at step S200, is displayed so as to be overlaid on the real-life scene viewed by the user 99 through the lens section (display section 32) of the wearable terminal. When the processing of step S202 has ended, processing transitions to step S204.

At step S204, determination is made as to whether or not the user 99 has reached the destination displayed at step S202. In cases in which affirmative determination is made at step S202, the system processing is ended. In cases in which negative determination is made at step S202, processing returns to step S200.

Operation and Effects

Explanation follows regarding operation and effects of the position-finding assist system according to the third example embodiment.

In the position-finding assist system according to the third example embodiment, position information relating to the target vehicle the user 99 intends to board is displayed on the display section 32 of the wearable terminal 30 worn by the user 99. This enables the user 99 to intuitively ascertain which direction to head in when searching for the target vehicle. This enables the user 99 to easily find the vehicle for which they are searching.

Other Embodiments

Position-finding assist systems according to various example embodiments have been explained above; however, various modifications may obviously be implemented within a range not departing from the spirit of the present disclosure. For example, the information displayed on the wearable terminal 30 worn by the user 99 is not limited to an arrow such as that illustrated in FIG. 5, and may be a display employing another symbol, a display employing an enclosing frame, a display employing numbers or letters corresponding to priority levels, or the like. Alternatively, the displayed information may be displayed in multiple colors, or a flashing image may be displayed.

In cases in which the above-described available parking space is an available parking space that has a particular restriction, such as a disabled parking space (such as 414 in FIG. 7), this available parking space may be excluded from the displayed information. Conversely, an available parking space or a preferential parking space that is a parking space that has a particular restriction, such as a disabled parking space, may be displayed, or displayed with higher priority.

A parking space adjacent to a wide traffic lane (passage) may be displayed as a preferential parking space. Alternatively, a parking space adjacent to a location that is not another parking space, such as a parking space positioned at the end or at a corner of plural adjacent parking spaces (such as the parking space 412 in FIG. 7) may be displayed as a preferential parking space. Alternatively, a parking space where a parking position of a vehicle parked in an adjacent parking space is relatively far away, or where a vehicle parked in an adjacent parking space is small in size, as detected by sensors or the like, may be displayed as a preferential parking space. Furthermore, information relating to an emergency exit may be displayed as the above-described destination information in case of an emergency.

Moreover, the positions and numbers of data processing units and controllers in the present system may be varied. For example, a controller may be installed to the vehicle 10 alone, or installed to the vehicle 10 and the wearable terminal 30 alone.

In the above-described system configurations, the terminal position information acquisition section 44 of the wearable terminal 30 may acquire (or predict) position information of the wearable terminal 30 indirectly by receiving position information acquired by the vehicle position information acquisition section 18 installed in the vehicle 10.

What is claimed is:

1. A position-finding assist system comprising:
    a glasses wearable terminal worn by a user;
    a terminal position information acquisition unit that acquires position information relating to the wearable terminal;
    a terminal orientation information acquisition unit that acquires orientation information relating to the wearable terminal;
    a gaze information acquisition unit that acquires gaze information relating to the user;
    a target parking position information acquisition unit that acquires target parking position information relating to an occupant-carrier vehicle; and
    a control unit that displays the target parking position information relating to a target parking position on a lens section of the wearable terminal, the target parking position information overlaid on an actual scene viewed by the user through the lens section, to assist the user in finding the target parking position based on the position information, the orientation information, the gaze information, and the target parking position information,
        the control unit derives a direction and position of the target parking position from the perspective of the user based on the position information, the orientation information, the gaze information, and the target parking position information, and
        the target parking position information is displayed using an arrow that is overlaid on the actual scene viewed by the user through the lens section to indicate the target parking position,
    wherein the target parking position information is information relating to an available parking position for the occupant-carrier vehicle, and
    wherein, in cases in which information relating to a plurality of target parking positions adjacent to each other has been acquired, the control unit prioritizes display, on the lens section of the wearable terminal, of a parking position of one of the target parking positions of the plurality of target parking positions adjacent to each other so as to be overlaid on the actual scene viewed by the user through the lens section.

2. The position-finding assist system of claim 1, wherein: the occupant-carrier vehicle is a vehicle carrying the user.

3. The position-finding assist system of claim 2, further comprising:
    a size information acquisition unit that acquires size information of the target parking position information,
    wherein the control unit prioritizes display, on the lens section of the wearable terminal, of the target parking position information relating to a larger size target parking position so as to be overlaid on the actual scene viewed by the user through the lens section.

4. The position-finding assist system of claim 2, further comprising:
    a departure prediction unit that predicts a departure of another vehicle,
    wherein the control unit further displays a position of the other vehicle predicted to depart by the departure prediction unit on the lens section of the wearable terminal so as to be overlaid on the actual scene viewed by the user through the lens section.

5. The position-finding assist system of claim 2, further comprising:
    a destination information acquisition unit that acquires information relating to a destination that the user will travel to after parking the occupant-carrier vehicle,
    wherein the control unit prioritizes display, on the lens section of the wearable terminal, of target parking position information close to the destination so as to be overlaid on the actual scene viewed by the user through the lens section.

6. The position-finding assist system of claim 1, wherein:
    the occupant-carrier vehicle is a vehicle that the user intends to board; and
    the target parking position information is position information relating to a location where the occupant-carrier vehicle is parked.

7. The position-finding assist system of claim 1, wherein:
    the target parking position information acquisition unit:
        configures part of a parking lot in which the user searches for an available parking position,
        acquires parking availability information relating to whether or not another vehicle is already parked in each parking position of the parking lot, and
        exchanges the target parking position information with the control unit;
    the control unit is provided on the wearable terminal;
    the target parking position information is displayed on the lens section of the wearable terminal based on the parking availability information.

* * * * *